United States Patent
Yoneya et al.

(10) Patent No.: US 7,880,847 B2
(45) Date of Patent: Feb. 1, 2011

(54) LIQUID CRYSTAL DISPLAY WITH GROUP OF INTERDIGITATED ELECTRODES

(75) Inventors: Makoto Yoneya, Hitachinaka (JP); Jong-Hyun Kim, Tsukuba (JP); Hiroshi Yokoyama, Tsukuba (JP); Jun Yamamoto, Tokyo (JP)

(73) Assignee: Japan Science and Technology Corporation, Kawaguchi-shi (JP)

( * ) Notice: Subject to any disclaimer, the term of this patent is extended or adjusted under 35 U.S.C. 154(b) by 1136 days.

(21) Appl. No.: 10/070,908

(22) PCT Filed: Jul. 9, 2001

(86) PCT No.: PCT/JP01/05930

§ 371 (c)(1),
(2), (4) Date: Jul. 21, 2002

(87) PCT Pub. No.: WO02/06887

PCT Pub. Date: Jan. 24, 2002

(65) Prior Publication Data

US 2002/0191136 A1  Dec. 19, 2002

(30) Foreign Application Priority Data

Jul. 13, 2000 (JP) ............................. 2000-213040
Mar. 9, 2001 (JP) ............................. 2001-066435

(51) Int. Cl.
*G02F 1/1337* (2006.01)
(52) U.S. Cl. .................. 349/132; 349/123; 349/126; 349/129
(58) Field of Classification Search ......... 349/123–129, 349/132–236

See application file for complete search history.

(56) References Cited

U.S. PATENT DOCUMENTS

| | | | | |
|---|---|---|---|---|
| 5,928,733 A * | 7/1999 | Yoneya et al. | ................ | 428/1.3 |
| 5,986,735 A * | 11/1999 | Komatsu | .................... | 349/128 |
| 6,091,471 A * | 7/2000 | Kim et al. | .................... | 349/124 |
| 6,628,360 B2 * | 9/2003 | Yamada et al. | .............. | 349/132 |

FOREIGN PATENT DOCUMENTS

| | | |
|---|---|---|
| JP | 08-262445 | 10/1996 |
| JP | 10-307295 | 11/1998 |
| JP | 11-352486 | 6/1999 |

* cited by examiner

*Primary Examiner*—Hoan C Nguyen
(74) *Attorney, Agent, or Firm*—Oblon, Spivak, McClelland, Maier & Neustadt, L.L.P.

(57) ABSTRACT

A high resolution, wide viewing angle, low power consumption liquid crystal display device which utilizes nematic liquid crystal and which can attain both the memory effect and wide-viewing-angle display characteristic. A liquid crystal display device that utilizes nematic liquid crystal and includes a pair of transparent substrates; a group of electrodes for applying to a liquid crystal layer disposed between the pair of substrates an electric field having a component substantially parallel to the surfaces of the substrates; and an alignment layer disposed between the liquid crystal layer and at least one of the pair of substrates and having been subjected to liquid crystal anchoring treatments in plural directions. The plurality of liquid crystal anchoring directions of the alignment layer form substantially equal angles relative to one another, and a rising angle in each of the liquid crystal anchoring directions with respect to the corresponding substrate surface is substantially zero.

11 Claims, 11 Drawing Sheets

(a)

(b)

(c)

(d)

F I G. 2
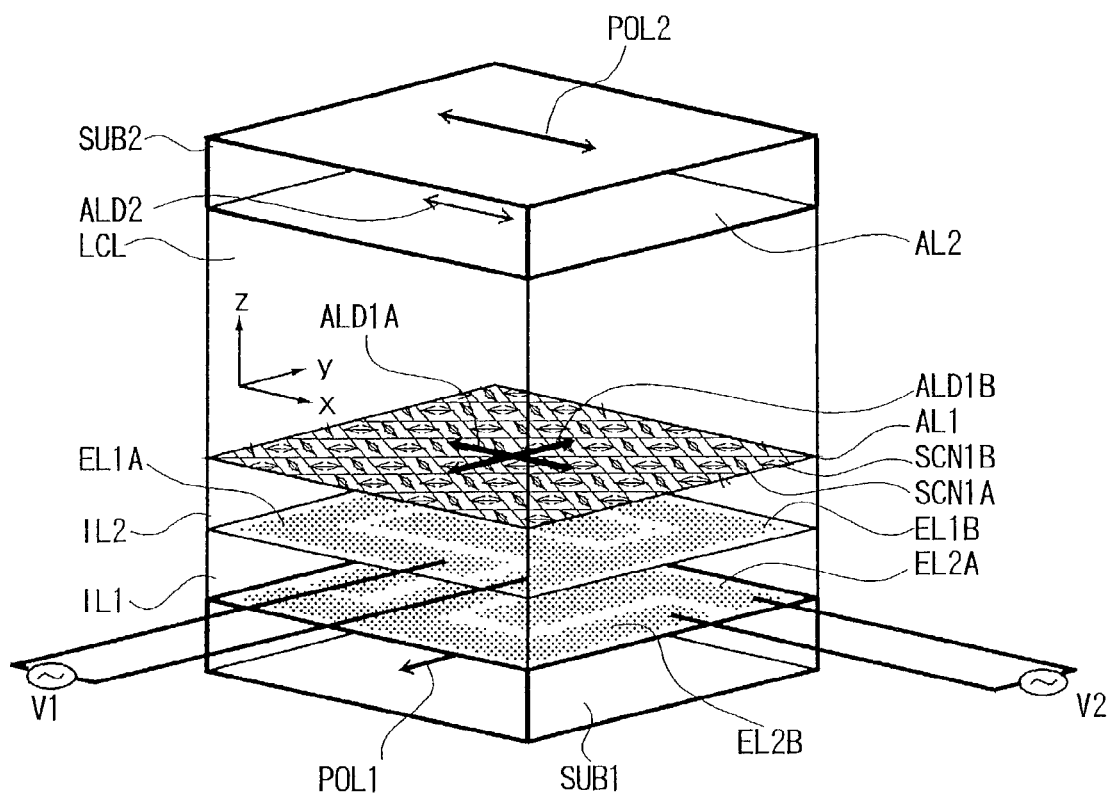

F I G. 3
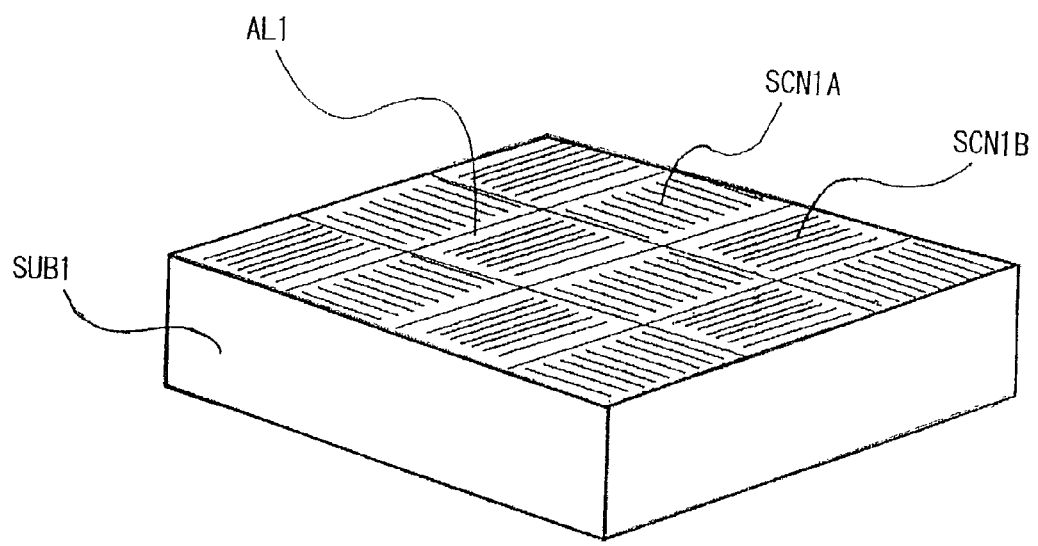

F I G. 5
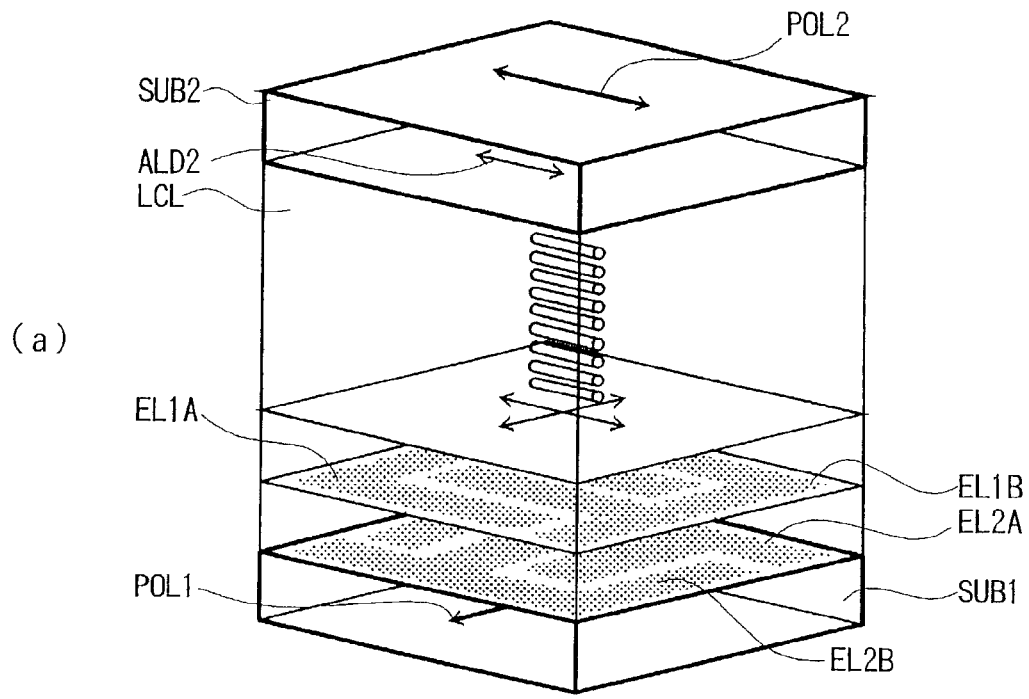
(a)
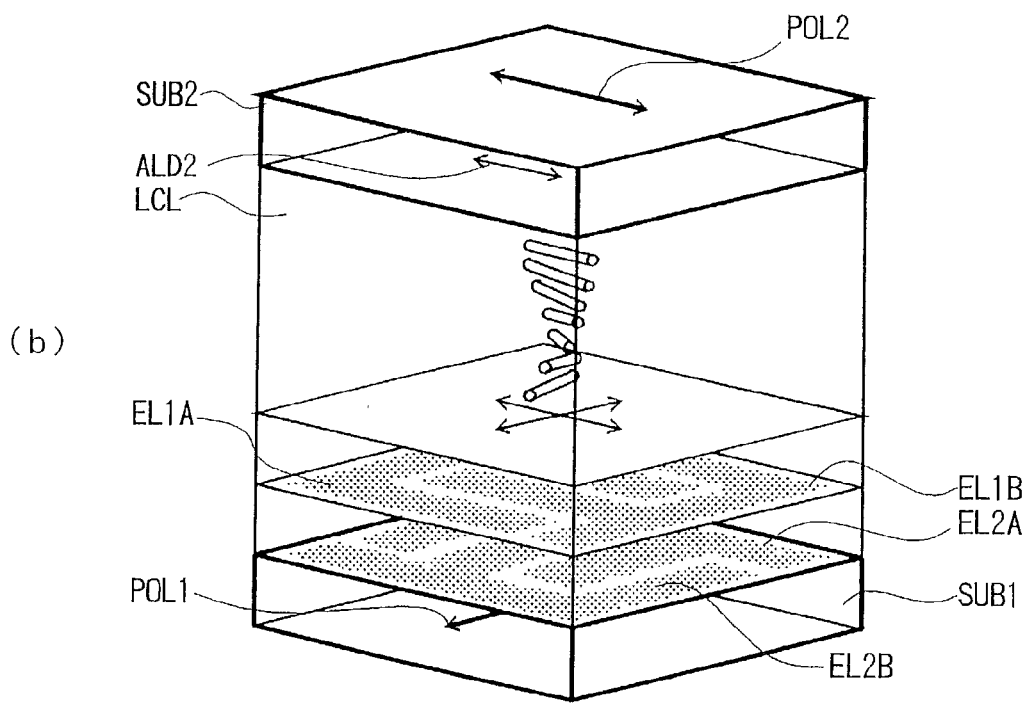
(b)

F I G. 7
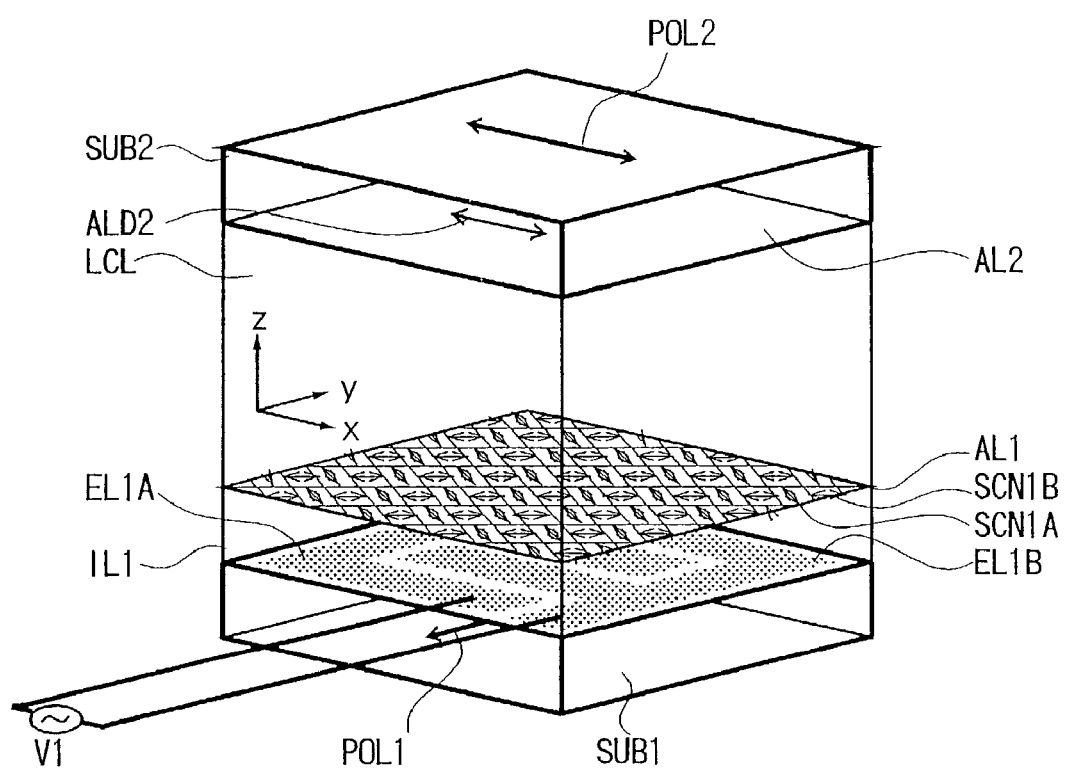

F I G. 9
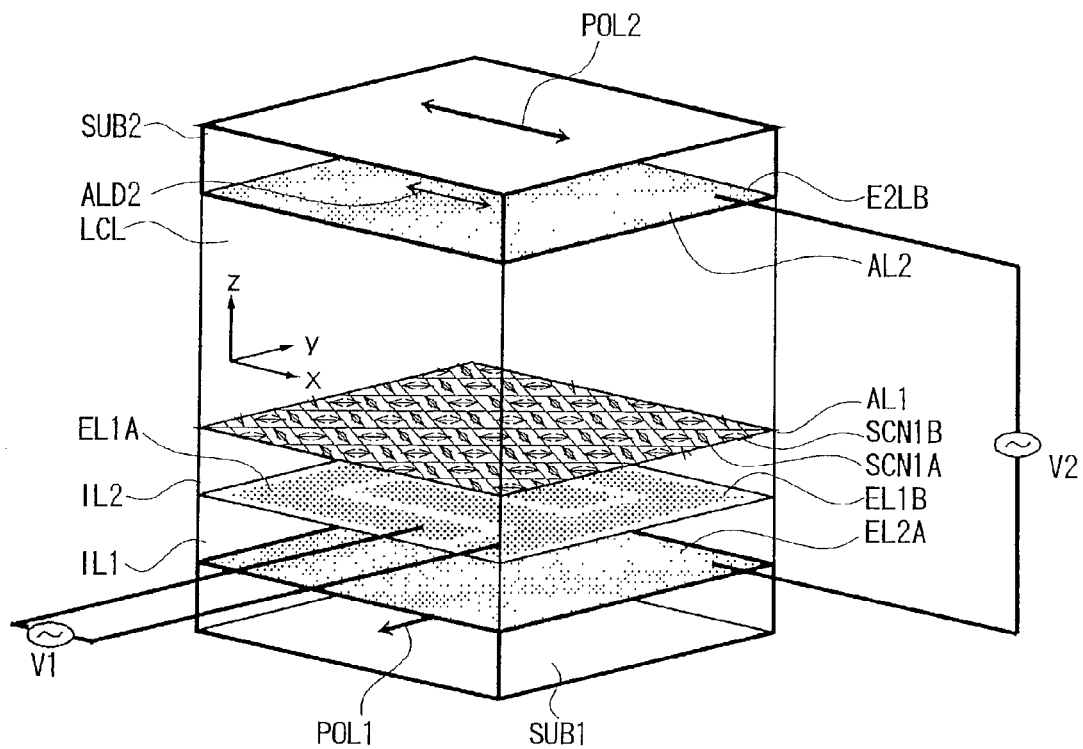

F I G. 10
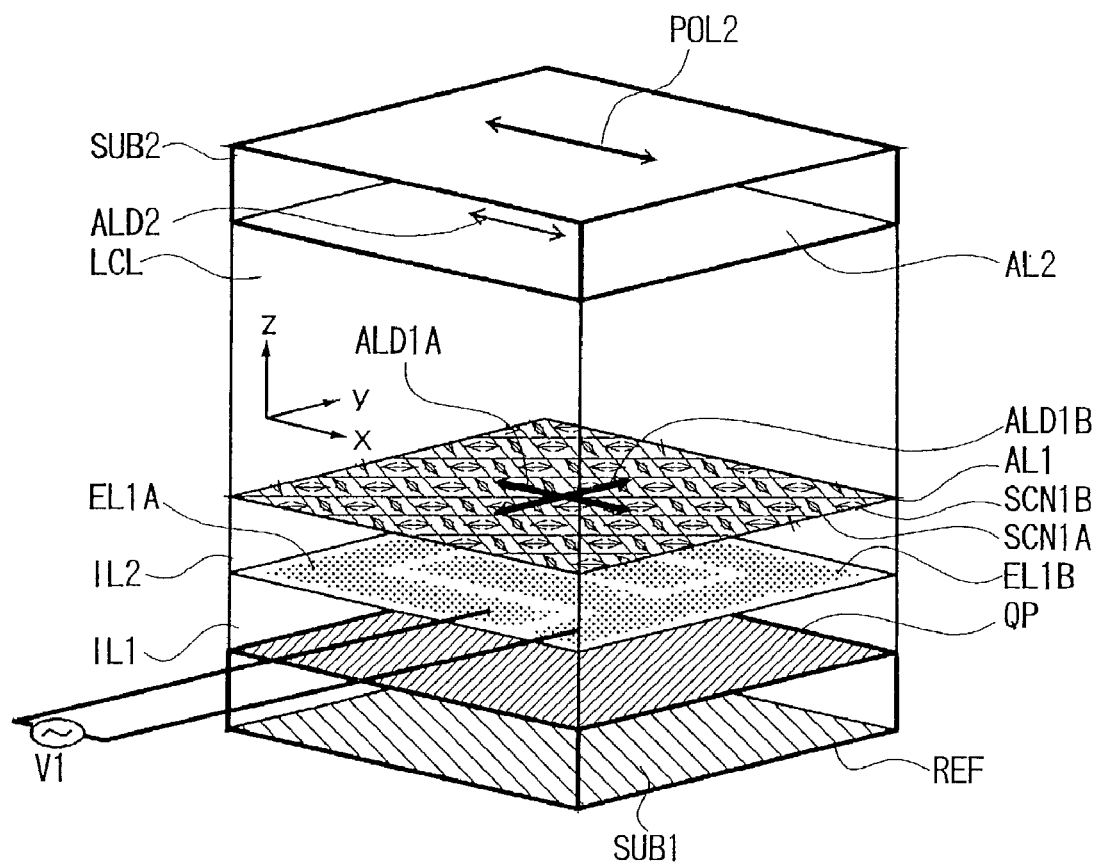

F I G. 11
(a)
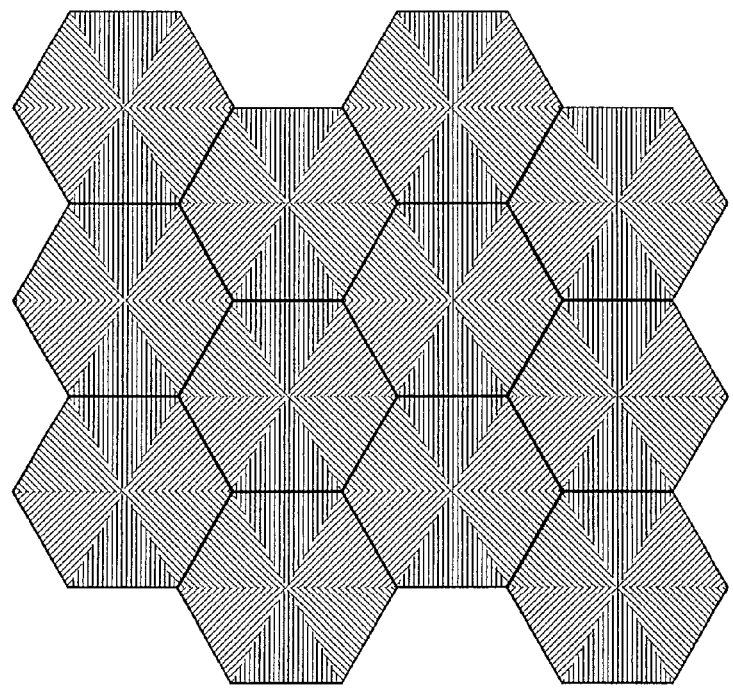
(b)
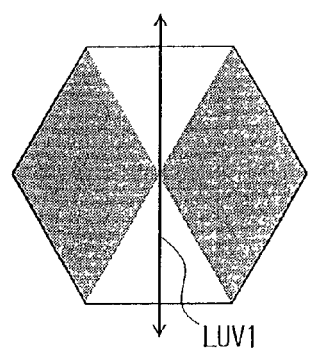
(c)
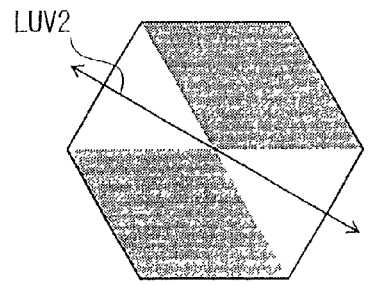
(d)
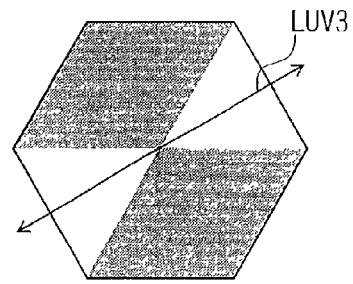

LIQUID CRYSTAL DISPLAY WITH GROUP OF INTERDIGITATED ELECTRODES

TECHNICAL FIELD

The present invention relates to a liquid crystal device, and more particularly to a liquid crystal device of low power consumption and high resolution.

BACKGROUND ART

Conventionally, as display devices used in portable information terminals such as cellular phones, liquid crystal display devices making use of nematic liquid crystal have mainly been used, by virtue of their low drive voltage and low power consumption characteristics. In association with the recent rapid increase in the use of portable information terminals, the number of such liquid crystal display devices being produced has increased accordingly. At the same time, there has arisen demand for higher display performance, such as an increased number of pixels (characters).

In addition, in view of a desire to lengthen the period of time over which battery-based portable apparatus can be continuously operated, technologies that attain not only the aforementioned higher display functions, including higher resolution, but also lower electric power consumption are being pursued.

In one such pursuit, there have been proposed a variety of techniques involving use of a liquid crystal display device having a so-called display memory effect, which enables display to be maintained even after power supply to the liquid display device is cut.

By the employment of the memory effect, when no changes occur in the contents being displayed, in principle, power consumption can be reduced to zero. Also, power consumption can be reduced by applying voltage on a pixel-by-pixel basis to only those pixels that correspond to portions of the display to be changed.

Incidentally, as is well known in the art, when passive matrix drive is employed in conventional Twisted Nematic (TN) mode or Super-Twisted Nematic (STN) mode, an upper limit is imposed on the number of pixels which can be displayed, due to limitation imposed on the duty ratio. However, use of the memory effect eliminates the restriction imposed on the number of pixels.

Specific examples of conventional techniques which employ the aforementioned display memory effect include, among others, a technique in which ferroelectric liquid crystal is used [*Applied Physics Letters,* 36, 899 (1980); Japanese Patent Application Laid-Open (kokai) No. 107216/1981] and a technique in which nematic liquid crystal is combined with alignment layers which have undergone fine grating treatment (Japanese kohyo (PCT) Patent Publication No. 513809/1999).

DISCLOSURE OF THE INVENTION

However, of the aforementioned conventional techniques, notwithstanding its advantages of quick response attributed to ferroelectricity and wide viewing angle attained by use of in-plane switching between two homogeneous alignment states, the former technique in which ferroelectric (chiral smectic C) liquid crystal is used has not yet found wide utility in practice, because of the following problems: the ferroelectric liquid crystal has a layer structure unique to smectic liquid crystal and thus entails difficulty in alignment control as compared to the case of ordinary liquid crystal display devices making use of nematic liquid crystal; and the layer structure, once broken under mechanical impact, is difficult to restore.

Meanwhile, the latter technique in which nematic liquid crystal is combined with alignment layers which have undergone fine grating treatment involves the following problem. That is, because this technique is based on switching between the two states of homeotropic (vertical) alignment state and hybrid alignment state while making use of flexoelectric effect, unsatisfactory viewing angle of the display arises in a specific direction, because of the hybrid alignment.

Moreover, in a liquid crystal device of this type, reduction in drive voltage requires the liquid crystal material to have a sufficiently high flexoelectric coefficient. However, since liquid crystal material of such high flexoelectric coefficient generally remains unknown, successful reduction in drive voltage and power consumption has not yet been attained. Thus, this technique also has not yet achieved widespread practical use.

As described above, according to the art known hitherto, liquid crystal displays including nematic liquid crystal, which do not have a layer structure and in which alignment control is easy, encounter difficulty in attaining both low power consumption by virtue of the memory effect and wide viewing angle of the display.

In view of the forgoing, an object of the present invention is to provide a high resolution, wide viewing angle, low power consumption liquid crystal display device which utilizes nematic liquid crystal and which can attain both the memory effect and wide-viewing-angle display characteristic.

The features of the present invention will be described below.

The wide-viewing-angle display characteristic can be attained when a liquid crystal display device has a configuration such that switching among a plurality of liquid crystal alignment states mainly occurs in the parallel direction to the surfaces of substrates that sandwich a liquid crystal layer. Further, in order to enable the liquid crystal display device to memorize the alignment states, the liquid crystal display device is configured in such a manner that these states remain energetically stable even after removal of applied voltage.

When no voltage is applied to the display device and thus no electric field is applied to the liquid crystal layer, the energy of a liquid crystal alignment state is represented by the sum of the elastic deformation energy of the liquid crystal layer itself and the energy of interface interaction between the liquid crystal layer and alignment layers provided on the surfaces of the substrates. Therefore, through utilization of an interface interaction which secures a sufficiently stable energy state in plural alignment directions in the substrate surface, the plurality of alignment states among which the state of liquid crystal is switched in the plane parallel to the substrate surface can be rendered stable.

Further, the energetic stability attained by means of the interface interaction is desirably equivalent in the plural alignment directions, in order to enable stable holding of the plurality of alignment states and stable switching among the alignment states.

Specific means for obtaining a liquid crystal interface alignment which renders liquid crystal equivalently energetically stable in the plural alignment directions in the substrate surface is employment of an alignment layer having undergone anchoring treatment in plural directions which form equal angles relative to one another in the substrate surface, wherein the anchoring treatment in each of the plural directions is performed in such a manner that the pre-tilt angle of liquid crystal molecules in the corresponding anchoring direction with respect to the substrate surface becomes substantially zero.

The action of such an alignment layer will be described with reference to an example case in which the number of anchoring directions in the substrate surface is two.

The alignment layer provides the same action even when the number of anchoring directions is greater than two, except for the condition of pre-tilt angles, which will be described later.

As shown in FIG. 1, when liquid crystal anchoring force of an alignment layer does not differ greatly between two anchoring directions, the alignment layer typically has a liquid crystal easy axis in a composite direction of the two directions, because of competition between the anchoring forces in the two directions.

When, as shown in FIG. 1(a), all the angles formed between the two anchoring directions are other than 90°, due to this breaking of symmetry, an easy axis which bisects a smaller relative angle becomes stable energetically, and equivalency between two liquid crystal easy axes for realizing a bistable state is lost.

Therefore, in order to equalize the alignment stabilities of the two easy axes, the alignment layer must be configured in such a manner that, as shown in FIG. 1(b), all the angles formed by the two anchoring directions, which serve as a source of the easy axes, become substantially equal; i.e., about 90° in this specific case.

Further, even in the above-described case in which the two anchoring directions in the substrate surface form about 90°, when anchoring force is provided to the alignment layer through rubbing treatment, which is generally used as a treatment for providing anchoring force, the liquid crystal alignment direction has a pre-tilt angle with respect to the substrate surface (pre-tilt angle of at least 1°, typically in the range of several to several tens of degrees in the case of ordinary rubbing treatment) which is generated naturally, and therefore, breaking of symmetry due to the pre-tilt angle must be considered as well.

As shown in FIG. 1(c), each liquid crystal anchoring direction having a pre-tilt angle can be represented as a directed vector which has an arrow in the direction in which liquid crystal molecules rise from the substrate surface.

Therefore, in the case shown in FIG. 1(c) in which two anchoring directions having pre-tilt angles intersect each other perpendicularly, of two generated easy axes, the axis (indicated by a thick dotted line) whose arrowhead falls between the arrowheads of the two anchoring directions becomes energetically stable. In this case as well, equivalency between two liquid crystal easy axes for realizing a bistable state is lost.

Considering breaking of symmetry stemming from the pre-tilt, it is understood that equivalency between the two easy axes can be attained when at least one of the pre-tilt angles of the two anchoring directions is substantially zero, as shown in FIG. 1(d).

By contrast, in the case in which the number of the anchoring directions is greater than two, as shown in FIG. 1(b), all the pre-tilt angles of the anchoring directions must be reduced to about 0 degrees in order to attain equivalency among the plurality of resultant easy axes.

Various methods may be used to provide liquid crystal anchoring, while reducing pre-tilt angle to substantially 0° to thereby secure equivalency among a plurality of easy axes. Examples of such a method include a so-called photo alignment method in which ultraviolet light having undergone linear polarization is irradiated onto a substrate surface which has been previously coated with a photosensitive material sensitive to the light; a method in which an apparatus having a basic structure similar to that of a so-called atomic force microscope (AFM) is caused to scan a substrate surface by use of a probe to thereby enforce stresses to the surface; and a method in which the substrate surface which has been previously coated with a photosensitive material is scanned in an arbitrary pattern by use of light in the form of a beam which causes chemical reaction, such as laser light in the ultraviolet range.

An alignment layer having a plurality of liquid-crystal anchoring directions can be obtained, for example, by repeating a plurality of times an optical alignment treatment of uniformly radiating linearly-polarized ultraviolet light over the entirety of a target region, while changing the direction of linear polarization.

In order to render sufficiently stable a plurality of liquid-crystal alignment easy axes obtained in the above-described manner, the relative strengths of anchoring forces of the plurality of competing anchoring directions, which serve as a source of the easy axes, must be controlled precisely.

This is apparent from failure of the above-described competing to occur when their relative strengths differ greatly from each other.

In an example case in which anchoring forces are produced in two directions, precise control of the ratio between the relative anchoring forces can be easily performed through employment of a method in which the first regions having one liquid-crystal anchoring direction and the second regions having another liquid-crystal anchoring direction, and these are arranged in a substrate surface in a pattern of, for example, a checkerboard, while the ratio between the total area of the first regions and the total area of the second regions is controlled.

In-plane switching of nematic liquid crystal for attaining above-described characteristic of wide viewing angle can be realized through provision of a group of electrodes for applying to the liquid crystal layer an electric field having a component substantially parallel to the substrate surface.

The in-plane switching may be effected by a method in which the above-described alignment layer which renders liquid crystal energetically stable in a plurality of alignment directions is disposed on each of two substrates in order to cause in-plane switching at both substrate interfaces; or a method in which the above-described alignment layer is disposed on one of the substrates, and alignment capability is imparted to the other substrate by means of ordinary rubbing treatment. In either case, the characteristic of wide viewing angle due to in-plane switching can be realized.

In the present invention, the following display methods can be employed. In the former case, display is effected by the birefringence optical mode between homogeneous states in different in-plane orientations. In latter case, display is effected by the optical rotatory mode between homogeneous and twisted planar states.

In the latter case which utilizes switching between the homogeneous and twisted planar states, a large energy difference is produced between the bistable switching states due to twist deformation of the liquid crystal layer, with possible generation of characteristics which are unfavorable from the viewpoint of drive, such as a large degree of asymmetry in switching threshold voltage.

Such unfavorable characteristics can be mitigated through employment of a liquid crystal material which contains a proper amount of chiral molecules as a chiral dopant in order to stabilize the twisted planar states.

The liquid crystal display device of the present invention can use a liquid material which has a positive or negative dielectric anisotropy ($\Delta\in$).

Further, a liquid crystal material which has a positive or negative dielectric anisotropy ($\Delta\in$) depending on the frequency of an alternating electric field applied thereto is used; and switching between the bistable states in one direction is effected by use of an alternating electric field of a frequency at which $\Delta\in$ becomes positive, and switching between the bistable states in the opposite direction is effected by use of an alternating electric field of a frequency at which $\Delta\in$ becomes negative. In this case, bidirectional switching between the two states can be carried out by use of merely a pair of interdegitated electrodes. Thus, the structure of the electrodes and their production process can be simplified.

As in the case of ordinary Twisted Nematic (TN) scheme, the above-described twisted planar state can be changed to a homeotropic (vertical alignment) state by means of a pair of surface electrodes which are provided on two substrate surfaces in order to apply an electric field to the liquid crystal layer substantially perpendicular to the substrate surface. However, when the electric field is removed in this state, the liquid crystal transforms to the homogeneous state. Therefore, switching between states can be effected by use of such means for applying a vertical electric field, which is particularly effective for refreshing all pixels of the display.

BRIEF DESCRIPTION OF THE DRAWINGS

FIG. 2 is a view showing the configuration of a liquid crystal display device according to the first embodiment of the present invention.

FIG. 3 is a perspective view showing a scanning pattern of a probe used in fabrication of the liquid crystal display device according to the first embodiment of the present invention.

FIG. 5 is a set of views schematically showing alignment states of liquid crystal in dark and light states, respectively, in the first embodiment of the present invention.

FIG. 7 is a view showing the configuration of a liquid crystal display device according to a third embodiment of the present invention.

FIG. 9 is a view showing the configuration of a liquid crystal display device according to a fourth embodiment of the present invention.

FIG. 10 is a view showing the configuration of a liquid crystal display device according to a fifth embodiment of the present invention.

FIG. 11 is a set of diagrams showing mask patterns according to a ninth embodiment of the present invention.

BEST MODE FOR CARRYING OUT THE INVENTION

Figure 1:
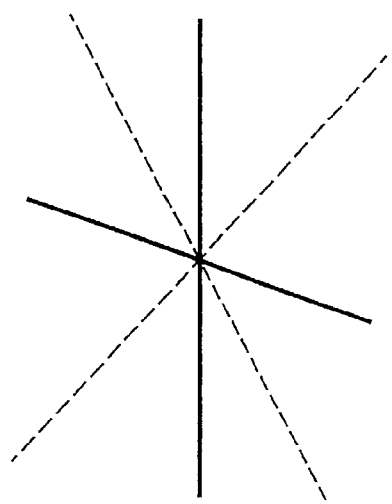
FIG. 1 is a diagram showing the configuration of a liquid crystal display device according to a first embodiment of the present invention.
Figure 1:
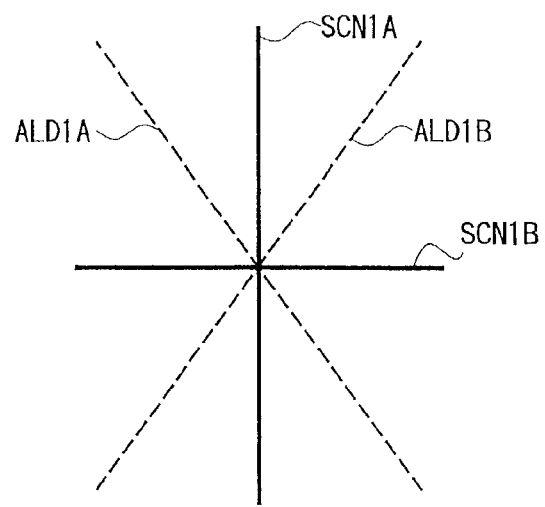
Figure 1:
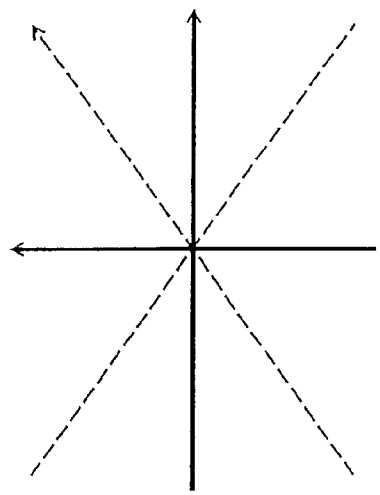
Figure 1:
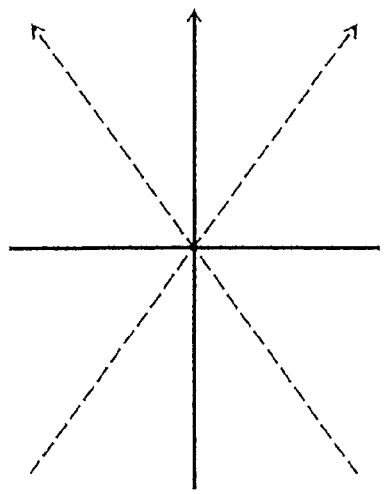

Embodiments of the present invention will next be described in detail.

FIG. 2 is a view showing the configuration of a liquid crystal display device according to a first embodiment of the present invention.

Two transparent glass substrates each having a thickness of 1.1 mm and polished surfaces were used for substrates SUB1 and SUB2 shown in FIG. 2.

A pair of interdegitated electrodes EL2A and EL2B were formed on the substrate SUB1 through a process of forming a transparent conductive layer of ITO (indium tin oxide) on the substrate and patterning the conductive layer. Subsequently, an insulating protective film IL1 of silicon nitride having a thickness of 600 nm was formed on the electrodes EL2A and EL2B.

Similarly, another pair of interdegitated electrodes EL1A and EL1B were formed on the insulating film IL1 perpendicular to the electrodes EL2 through a process of forming a transparent conductive layer of ITO on the insulating film IL1 and patterning the conductive layer. Subsequently, an insulating protective film IL2 of silicon nitride having a thickness of 200 nm was formed on the electrodes EL1A and EL1B.

LCL denotes a liquid crystal layer.

The longitudinal directions of the interdegitated electrodes EL1 and EL2 correspond to an x-axis direction and a y-axis direction, respectively, of a coordinate system shown in FIG. 2.

The interdegitated electrodes EL1 and EL2 each have a width of 6 μm and have an inter-electrode distance of 4 μm. In the drawing, only three inter-electrode gaps are shown in order to facilitate understanding. However, a device that was actually fabricated has eight inter-electrode gaps.

Next, after a solution of SE7210 (product of Nissan Chemical Industries, Ltd.), which is solvent-soluble polyimide precursor, was applied to the insulating film IL2, the substrate SUB1 was heated to 200° C. and then allowed to stand for 30 minutes to thereby obtain a dense polyimide film.

Subsequently, a stress generation line pattern was formed on the surface of the thus-obtained polyimide film by use of an apparatus having a basic structure similar to that of an AFM. Specifically, a stress generation line pattern was formed on the surface of the polyimide film by use of a probe made of $Si_3N_4$ or Si and having a tip end sharpened to an atomic level, the probe having been adjusted to impart stress of 20 to 30 nN to the film surface.

Next, the scanning pattern of the probe will be described with reference to FIG. 3.

The scanning was controlled in such a manner that, in small square regions arranged in a checkerboard pattern, linear scanning was performed alternately in directions SCN1A and SCN1B, which are substantially perpendicular to each other.

The small square regions each had a size of about 1 μm square; and a plurality of line patterns for generation of stress were formed in each region through an operation of linearly scanning each region by use of the probe, at a density of 35 lines/μm.

The scanning operation was performed in order to reduce pre-tilt angle involved in liquid crystal alignment to about 0°; i.e., the scanning directions in adjacent positions become opposite as in the case of a picture drawn with a single stroke of a brush.

The above-described pattern shape and pattern density are a mere example and may be adjusted in accordance with the properties of a liquid crystal material to be used.

The direction of the grid pattern and the linear scanning directions SCN1A and SCN1B are set to form an angle of about 45° with the x-axis and y-axis directions in the coordinate system of FIG. 2.

In the thus-formed alignment layer AL1, a plurality of regions having a plurality of liquid-crystal easy alignment axes are disposed on the substrate surface. As a result, the alignment layer AL1 serves as an alignment layer which has two easy alignment axes in ALD1A and ALD1B directions, which correspond to the x-axis and y-axis directions of the coordinate system shown in the drawing.

After a dense polyimide film was formed on the other substrate SUB2 in a manner similar to that described above, the surface of the alignment film was rubbed by use of buff cloth attached to a rubbing roller, in order to provide liquid-crystal alignment capability to the alignment film such that a single easy alignment axis was provided in an ALD2 direction, which corresponds to the x-axis direction of the coordinate system shown in the drawing.

Subsequently, the two substrates were assembled in such a manner that their surfaces having liquid-crystal alignment capability faced each other via spacers formed of dispersed spherical polymer beads and a seal member provided at the peripheral portions of the substrates. Thus, a liquid crystal cell was completed.

Subsequently, a nematic liquid crystal composition ZLI-4535 (product of Merck & Co., Inc.; dielectric anisotropy $\Delta\epsilon$: positive, 14.8; refraction index anisotropy $\Delta n$: 0.0865) was introduced into the space between the substrates of the liquid crystal cell under vacuum. Subsequently, the liquid crystal cell was sealed with a seal material formed of ultraviolet ray curing resin, to thereby complete a liquid crystal panel.

By means of the above-described spacers, the thickness of the liquid crystal layer was adjusted to 6.4 μm as measured after filling of liquid crystal. Accordingly, the liquid crystal display device of the present embodiment has a retardation ($\Delta nd$) of 0.5 μm.

Subsequently, the panel was sandwiched between two polarization plates POL1 and POL2 (G1220DU, product of Nitto Denko Corporation), which were disposed in such a manner that the polarization/transmission axis POL1 of one polarization plate became substantially parallel to the rubbing direction ALD2, and the polarization/transmission axis POL1 of the other polarization plate became perpendicular thereto.

Subsequently, a drive circuit, a back light, etc. were connected to the liquid crystal display device.

The switching characteristics of the liquid crystal display device according to the first embodiment will be described with reference to FIG. 4.

Figure 4:
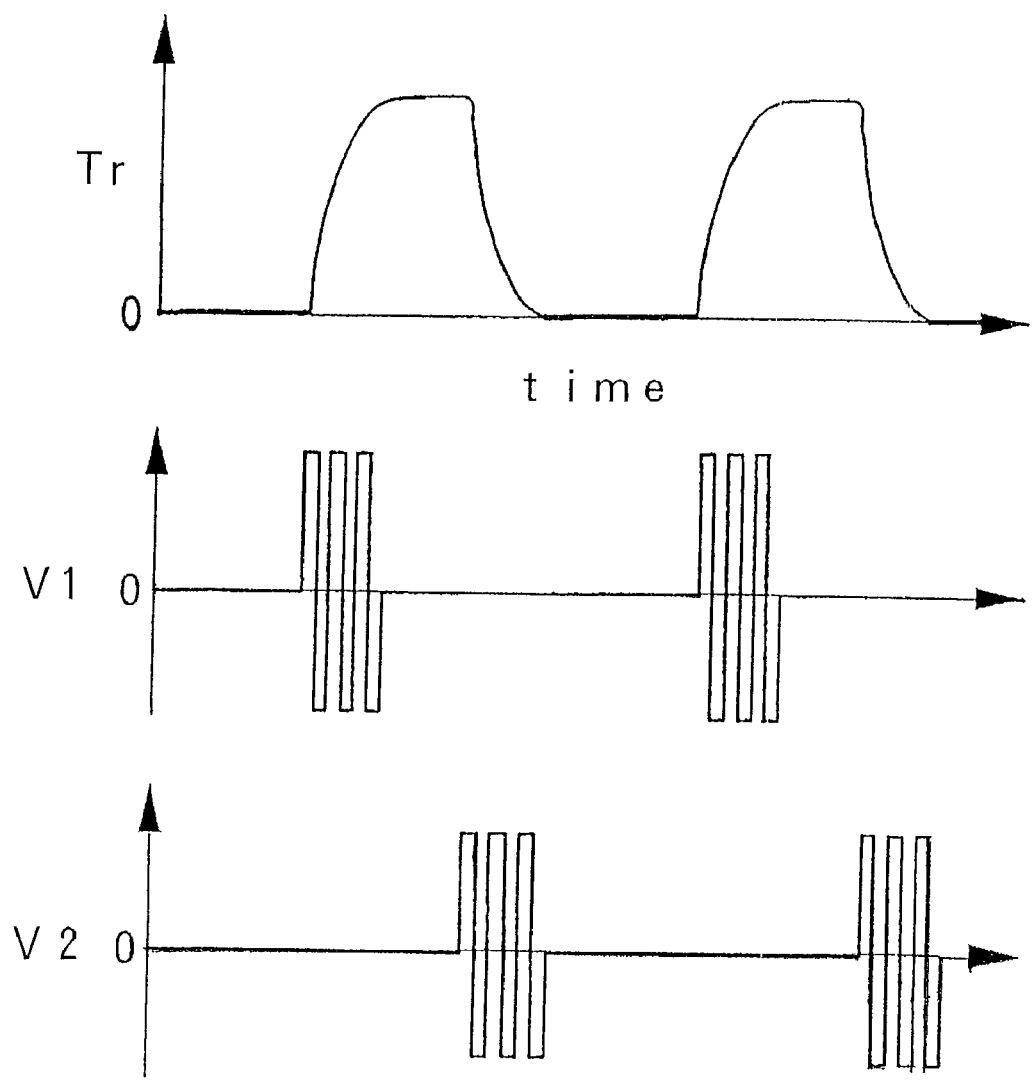
FIG. 4 is a set of time charts showing the switching characteristics of the liquid crystal display device according to the first embodiment of the present invention.

In FIG. 4, V1 represents the waveform of voltage applied between the first interdegitated electrodes EL1A and EL1B; V2 represents the waveform of voltage applied between the second interdegitated electrodes EL2A and EL2B; and Tr represents variation in transmission coefficient of the liquid crystal device.

As is shown in FIG. 4, the liquid crystal device of the present embodiment can perform switching between two memory states; i.e., bright and dark states, through selective application of AC voltages V1 and V2.

In the present embodiment, the switching AC voltage V1 was 8 Vpp, and the switching AC voltage V2 was 6 Vpp. That is, a slight degree of drive voltage asymmetry was observed.

FIG. 5 schematically shows alignment states of the liquid crystal layer which correspond to a dark state (see FIG. 5(a)) and a bright state (see FIG. 5(b)).

As shown in FIG. 5, the switching between the two states is carried out by means of substantially in-plane switching of molecular alignment of the liquid crystal.

Subsequently, the viewing angle of the liquid crystal display device of the present embodiment was measured by use of a liquid-crystal view angle measurement apparatus, model CV-1000 (product of Minolta Co., Ltd.). The measurement results reveal that the liquid crystal display device has a wide viewing angle; specifically, the display device has a contrast ratio not less than 10:1 and has no tone reversal, over an entire range including an upper 140° range, a lower 140° range, a left 140° range, and a right 140° range.

Visual inspection of image quality reveals that no great change in displayed color is observed even when the display device is viewed obliquely, and the display device provides highly uniform display.

Next, a second embodiment of the present invention will be described.

A liquid crystal display device according to the second embodiment was fabricated in a manner similar to that of the first embodiment, except that a film of a photosensitive materials was formed on one substrate as an alignment layer, and the surface of the film was scanned by use of ultraviolet light; and a liquid crystal composition contained CB-15 of Merck as a chiral dopant and was composed such that the composition had a helical pitch of about 15 μm.

Specifically, a mixture of diamine compounds containing equimolar amounts of 4,4'-diaminodiphenylmethane and a compound of Formula 1 having a diazobenzene group was treated with an acid anhydride of pyromellitic dianhydride and/or 1,2,3,4-cyclobutantetracarboxylic acid, to thereby form a mixture of polyamic acids. After being applied to the substrate surface, the mixture of polyamic acids was fired at 200° C. for 30 minutes to thereby be imidized. By use of GaN a laser light (wavelength: 420 nm), the same pattern as that used in the first embodiment was formed on the surface to thereby complete an alignment layer.

Although a GaN laser was used, an HeCd laser whose oscillation wavelength is close to that of the GaN laser may be used.

Further, in place of the compound of Formula 1, compounds represented by Formula 2 and Formula 3 may be used as a photosensitive material.

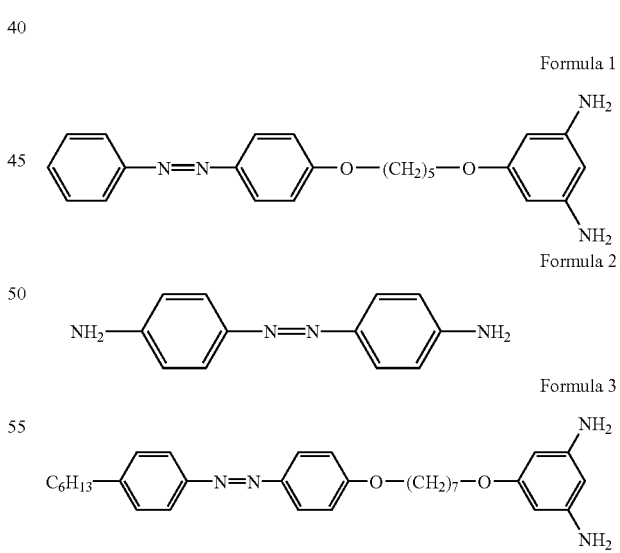

Formula 1

Formula 2

Formula 3

Figure 6:
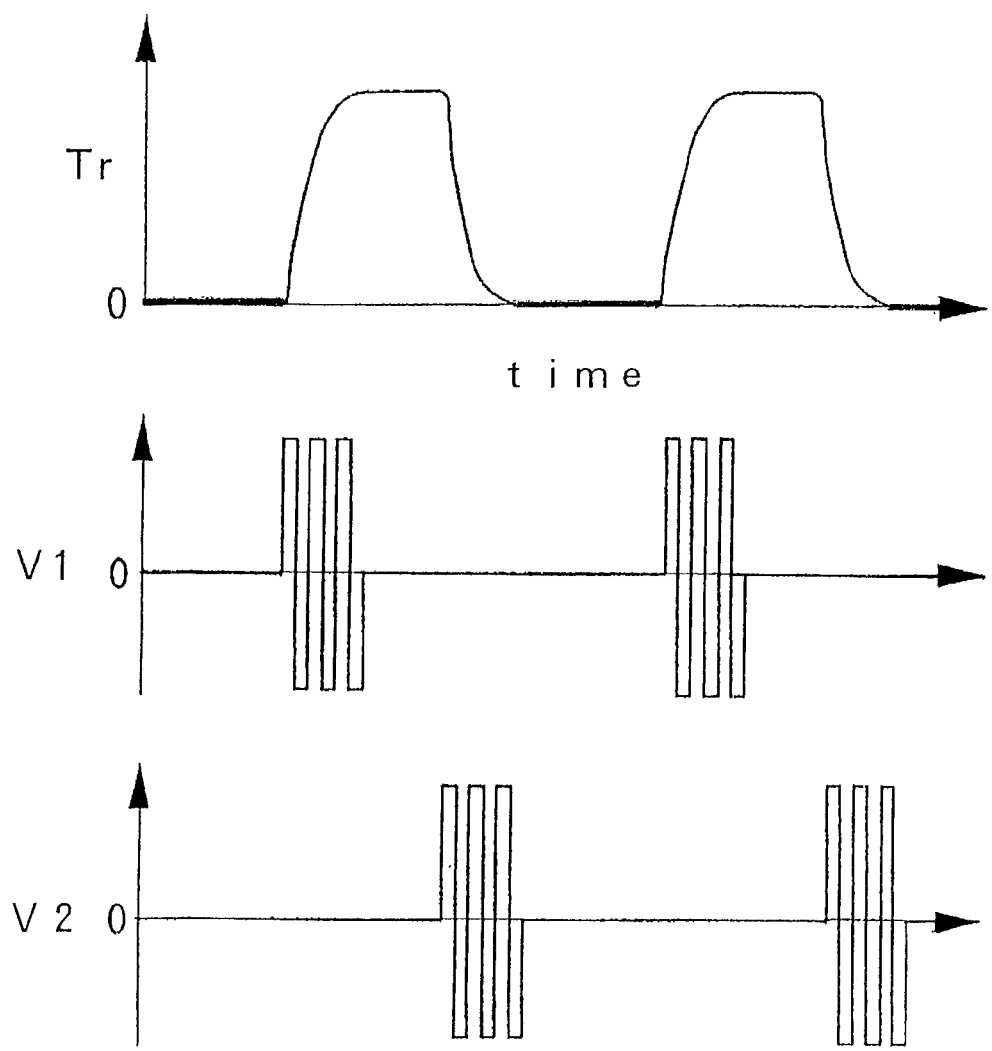
FIG. 6 is a set of time charts corresponding to FIG. 4 and showing an electro-optic property of a liquid crystal display device according to a second embodiment of the present invention.

FIG. 6 is a set of time charts corresponding to FIG. 4 and showing an electro-optic property of the liquid crystal display device according to the present embodiment. In the case of the present embodiment, the switching AC voltage V1 was 5 Vpp, and the switching AC voltage V2 was 4.8 Vpp. That is, the asymmetry between the drive voltages V1 and V2 could be eliminated, because addition of the chiral dopant stabilized the energy state of the twisted planar state.

Results of a viewing angle measurement similar to that employed in the first embodiment show that the liquid crystal display device of the present embodiment provides a highly uniform display and a wide viewing angle as in the case of the first embodiment.

Next, a third embodiment of the present invention will be described.

A liquid crystal display device according to the third embodiment was fabricated in a manner similar to that of the first embodiment, except that TX2A of Merck was used as a liquid crystal material; as shown in FIG. 7, a single pair of interdegitated electrodes were provided; and a two-frequency drive circuit was used.

The liquid crystal composition TX2A is a nematic composition whose dielectric anisotropy ($\Delta\in$) becomes positive at low frequency and negative at high frequency and which is therefore suitable for two-frequency drive. The crossover frequency of the liquid crystal composition is 6 kHz.

Figure 8:
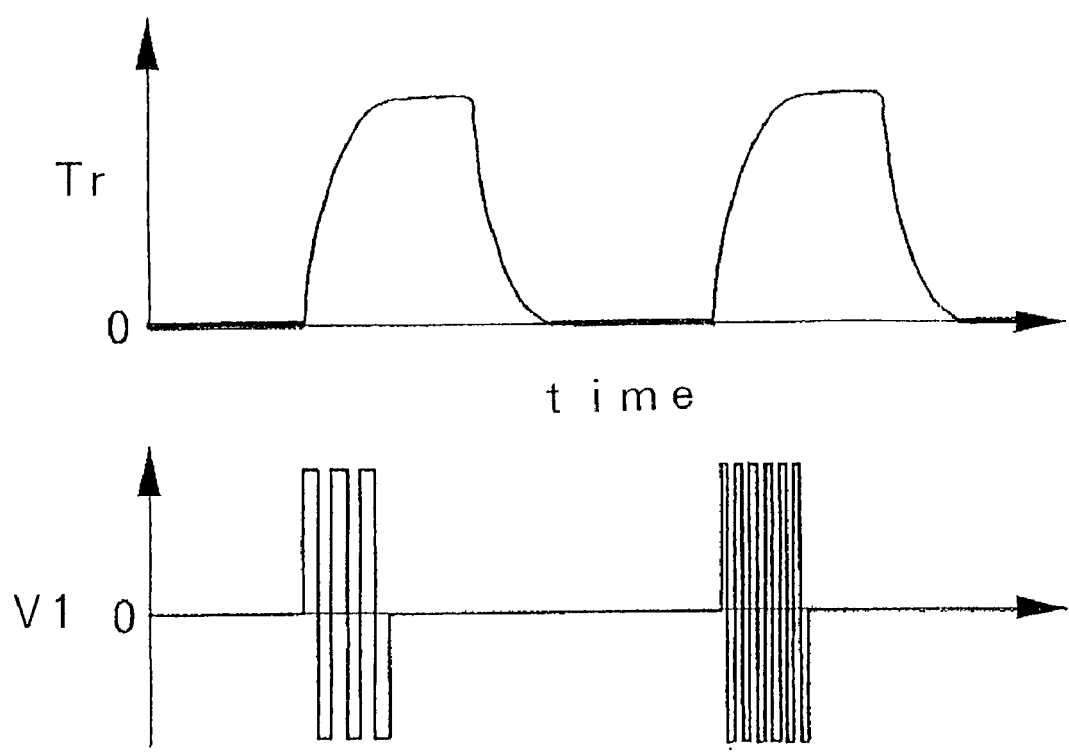
FIG. 8 is a set of time charts showing a drive waveform and an electro-optic property of the liquid crystal display device according to the third embodiment of the present invention.

FIG. 8 shows a drive waveform and an electro-optic property of the liquid crystal display device according to the present embodiment. As shown in FIG. 8, switching between two states by use of the single pair of interdegitated electrodes could be effected by use of AC voltage V1 which had an amplitude of 8 vpp and a frequency of 4 kHz (at which $\Delta\in$ of TX2A becomes positive) for switching from a dark (homogeneous) state to a bright (twisted planar) state and an amplitude of 10 vpp and a frequency of 8 kHz (at which $\Delta\in$ of TX2A becomes negative) for switching in the reverse direction.

Results of a viewing angle measurement similar to that employed in the first embodiment show that the liquid crystal display device of the present embodiment provides a highly uniform display and a wide viewing angle as in the case of the first embodiment.

Next, a fourth embodiment of the present invention will be described.

A liquid crystal display device according to the fourth embodiment was fabricated in a manner similar to that of the third embodiment, except that a pair of parallel plate electrodes were added to the substrates SUB1 and SUB2, as shown in FIG. 9.

Each of the parallel plate electrodes is formed of an ITO transparent electrode and is connected to a drive circuit which applies AC voltage V2 to the parallel plate electrodes.

The liquid crystal display device of the present embodiment has an electro-optic property and viewing angle substantially identical with those of the third embodiment. However, refreshing display for simultaneously bringing the plurality of pixels from a bright state to a dark state could be effected through application of AC voltage (4 kHz, 20 Vpp) to the added parallel plate electrodes.

Next, a fifth embodiment of the present invention will be described.

A liquid crystal display device according to the fifth embodiment was fabricated in a manner similar to that of the third embodiment, except that a light reflection plate REF was disposed on a lower surface of the substrate SUB1, and a $\lambda/4$ plate QP was disposed on an upper surface of the substrate SUB1, as shown in FIG. 10, and the cell gap was halved to 3.2 μm; and that stress which a probe applied to the alignment layer AL1 during scanning in the two scanning directions SCN1A and SCN1B was adjusted in order to provide two liquid-crystal easy alignment axes ALD1A and ALD2A which form an angle of 45° therebetween.

In the present embodiment, the direction of the delay axis of the $\lambda/4$ plate QP is set to form an angle of about 45° with the transmission axis of the polarization plate POL2, so that the easy alignment axis ALD1A of the alignment layer AL1 becomes parallel to ALD2, and the easy alignment axis ALD1B of the alignment layer AL1 rotates by 45° from ALD2.

By virtue of the above-described configuration of the alignment layer AL1, two stable alignment states of the liquid crystal layer in the present embodiment become equivalent to those obtained by twisting the state shown in FIG. 5(b) by 45°. As in the case of the transmission type configuration of FIG. 5, the liquid crystal layer becomes dark when uniformly aligned and bright when brought into a twisted planar state (45°).

The liquid crystal display device of the present embodiment has an electro-optic property and viewing angle substantially identical with those of the third embodiment. However, the optical property is obtained as a reflection coefficient, not a transmission coefficient.

Next, a sixth embodiment of the present invention will be described.

A liquid crystal display device according to the sixth embodiment was fabricated in a manner similar to that of the first embodiment, except that as in the case of the substrate SUB2 side, the surface of the polyimide film formed on the substrate SUB1 was rubbed by use of buff cloth attached to a rubbing roller along a direction of 45° with respect to the x-axis direction of the coordinate system of FIG. 1, to thereby impart liquid-crystal alignment capability to the alignment film to have a single easy alignment axis.

Subsequently, the entirety of the rubbed area was uniformly scanned by use of an apparatus having a basic structure similar to that of an AFM, as in the case of the first embodiment. Specifically, by use of a probe made of $Si_3N_4$ or Si and having a tip end sharpened to an atomic level, which has been adjusted to impart stress of 20 to 30 nN to the film surface, a stress generation line pattern was formed on the film surface along a direction of 45° with respect to the y-axis of the coordinate system of FIG. 1.

Over the entirety of the thus treated area, rubbing treatment and AFM scanning treatment were performed successively, while changing the rubbing direction and the scanning direction by 90°, to thereby obtain the alignment layer AL1. The thus-formed alignment layer AL1 had two easy alignment axes in the ALD1A and ALD1B directions, which correspond to the x-axis and y-axis directions in the coordinate system of FIG. 1, as in the case of the first embodiment. The liquid crystal display device of the present embodiment has an electro-optic property and viewing angle substantially identical with those of the first embodiment.

Next, a seventh embodiment of the present invention will be described.

A liquid crystal display device according to the seventh embodiment was fabricated in a manner similar to that of the second embodiment in which the surface of the photosensitive film formed on the surface of one substrate as an alignment film was scanned by use of ultraviolet rays. However, in the present embodiment, light from the ultraviolet source was converted to linearly polarized ultraviolet light by use of a polarization device utilizing a Brewster angle; and the polarized ultraviolet light was irradiated onto the alignment layer twice via two photomasks having the same square checkerboard pattern as that used in the first and second embodiments.

Specifically, as in the second embodiment, a mixture of diamine compounds containing equimolar amounts of 4,4'- diaminodiphenlmethane and a compound of Formula 1 having a diazobenzen group was treated with an acid anhydride of pyromellitic dianhydride and/or 1,2,3,4-cyclobbutantetracarboxylic acid, to thereby form a mixture of polyamic acids. After being applied to the substrate surface, the mixture of polyamic acids was fired at 20° C. for 30 minutes to thereby be imidized. Subsequently, the polarized ultraviolet light was radiated twice, the direction of linear polarization having been rotated 90°, in such a manner that portions corresponding to the black areas of the checkerboard pattern of the photo masks were irradiated with the polarized ultraviolet light in the first stage, and portions corresponding to the white areas of the checkerboard pattern of the photo masks were irradiated with the polarized ultraviolet light in the second stage.

The polarized ultraviolet light was radiated onto the alignment layer perpendicular to the substrate surface, whereby the pre-tilt angle of the given liquid crystal alignment was made substantially zero. In place of the compound of Formula 1, compounds represented by Formula 2 and Formula 3 may be used as a photosensitive material. The liquid crystal display device of the present embodiment has an electro-optic property and viewing angle substantially identical with those of the second embodiment.

Next, an eighth embodiment of the present invention will be described.

A liquid crystal display device according to the present embodiment was fabricated in a manner similar to that of the seventh embodiment, except that polarized ultraviolet light was radiated twice onto each of the photosensitive films (alignment layers) formed on the two substrates sandwiching the liquid crystal via two photomasks having the same square checkerboard pattern as that used in the seventh embodiment, while the intensity of the polarized ultraviolet light was changed between the first and second irradiation operations, whereby resultant two easy alignment axes of the alignment layer formed an angle of 45° as in the case of the fifth embodiment, and that no chiral dopant material was added.

Switching of the liquid crystal display device of the present embodiment is performed in the following manner. Since an alignment layer which realizes an energetically stable state in two alignment directions is disposed on both the substrates, in-plane switching (switching angle: 45°) occurs in each of the two substrate interfaces. The alignment layers and the two polarization plates disposed in a crossed Nicol relation with the alignment layers enable display by the birefringence optical mode between homogeneous states in different in-plane orientations.

The liquid crystal display device of the present embodiment has an electrooptic property and viewing angle substantially identical with those of the seventh embodiment. However, the liquid crystal display device of the present embodiment differs from that of the seventh embodiment in that the optical property is obtained as a coefficient of transmission by the birefringence optical mode.

Next, a ninth embodiment of the present invention will be described.

A liquid crystal display device according to the present embodiment was fabricated in a manner similar to that of the seventh embodiment, except for the following. When linearly polarized ultraviolet light was radiated onto the surface of the photosensitive film formed on the surface of one substrate as an alignment film was scanned by use of ultraviolet rays, three photomasks having a honeycomb pattern as shown in FIG. 11 were used, and the polarized ultraviolet light was radiated onto the alignment layer three times, while the direction of linear polarization was rotated by 60° each time. Further, three pairs of comb-like electrodes were formed on the substrate SUB1 to form an angle of 60° therebetween, and a drive circuit was provided for each pair. Moreover, a phase plate having properly adjusted optical properties was disposed immediately before the polarization plate on the outgoing side.

FIGS. 11(b), 11(c), and 11(d) show the three photomasks of the honeycomb pattern and polarization directions of the linearly polarized ultraviolet light corresponding thereto.

Switching of the liquid crystal display device of the present embodiment is performed in the following manner. An alignment layer which realizes an energetically stable state in three alignment directions having an inter-direction angle of 60° is disposed on one substrate. Therefore, in-plane switching (switching angle: 60°, 120°) occurs when proper drive voltages are applied to the three pairs of interdegitated electrodes.

Accordingly, as the entire liquid cell, three states; i.e., a homogeneous state (twist angle: 0°), a 60°-twisted state, and a 120°-twisted state, can be memorized.

Further, when the optical properties of the phase plate were adjusted in order to cause the display to become black in the homogeneous state and white in the 120°-twisted state, three gradations, including an intermediate gradation in the 60°-twisted state, were obtained.

The present invention is not limited to the embodiments described above. Numerous modifications and variations of the present invention are possible in light of the spirit of the present invention, and they are not excluded from the scope of the present invention.

As described in detail, the present invention can provide a liquid crystal display device which utilizes nematic liquid crystal and which can attain both wide viewing angle and low power consumption by virtue of the memory effect.

Industrial Applicability

The liquid crystal display device of the present invention can be applied to electronic devices having display units, and is particularly suitable for portable information terminals, because of wide viewing angle and low power consumption by virtue of the memory effect.

The invention claimed is:

1. A liquid crystal display device comprising
   a pair of substrates, at least one of which is transparent;
   a nematic liquid crystal layer between the pair of substrates;
   a group of interdigitated electrodes formed on at least one of the substrates and adapted to apply an electric field to said liquid crystal layer, wherein the electric field has a component substantially parallel to the surfaces of the substrates;
   and an alignment layer disposed between the nematic liquid crystal layer and at least one of the substrates,
   wherein the alignment layer has been subjected to liquid crystal anchoring treatments in plural directions to form a plurality of liquid crystal in-plane anchoring directions,
   the plurality of liquid crystal in-plane anchoring directions of the alignment layer form substantially equal angles relative to one another on the corresponding substrate surface,
   a pretilt angle in each of the liquid crystal anchoring directions with respect to the corresponding substrate surface is substantially zero.

2. A liquid crystal display device according to claim 1, wherein at least one of the liquid crystal anchoring treatments in plural directions comprises
   performing uniform anchoring treatment over an entire target area in each of the in-plane directions.

3. A liquid crystal display device according to claim 1, wherein at least one of the liquid crystal anchoring treatments in plural in-plane directions comprises
　　dividing an entire target area into plural sub-areas corresponding to the plural in-plane directions and
　　performing anchoring treatment in each of the sub-areas in the corresponding in-plane direction.

4. A liquid crystal display device according to claim 1, wherein at least one of the liquid crystal anchoring treatments in plural in-plane directions comprises
　　irradiating the alignment layer with linearly polarized light which is capable of causing a chemical reaction on the surface of the corresponding substrate.

5. A liquid crystal display device according to claim 1, wherein at least one of the liquid crystal anchoring treatments in plural in-plane directions comprises
　　scanning the alignment layer with a probe which is capable of imparting stress to the surface of the corresponding substrate.

6. A liquid crystal display device according to claim 1, wherein at least one of the liquid crystal anchoring treatments in plural in-plane directions comprises
　　scanning the alignment layer with light which is capable of causing a chemical reaction on the surface of the corresponding substrate.

7. A liquid crystal display device according to claim 1, wherein the liquid crystal layer comprises a liquid crystal material which comprises chiral molecules.

8. A liquid crystal display device according to claim 1, wherein the liquid crystal layer comprises a liquid crystal material having a positive or negative dielectric anisotropy depending on the frequency of an applied AC electric field.

9. A liquid crystal display device according to claim 1, further comprising an additional electrode on each of the substrates wherein the additional electrodes form a pair.

10. A liquid crystal display device according to claim 1, further comprising a light reflection plate on one of the substrates.

11. The liquid crystal display device according to claim 1, wherein the device is capable of maintaining a plurality of stable in-plane alignment states of the liquid crystal layer even after the removal of the applied electric field.

* * * * *